(12) United States Patent
Marques et al.

(10) Patent No.: US 11,096,335 B2
(45) Date of Patent: Aug. 24, 2021

(54) MIXED AIR FLOW FAN FOR AERATING AN AGRICULTURAL STORAGE BIN

(71) Applicants: Al Marques, Swift Current (CA); Jeff Powell, Swift Current (CA)

(72) Inventors: Al Marques, Swift Current (CA); Jeff Powell, Swift Current (CA)

(73) Assignee: S3 ENTERPRISES INC., Regina (CA)

( * ) Notice: Subject to any disclaimer, the term of this patent is extended or adjusted under 35 U.S.C. 154(b) by 235 days.

(21) Appl. No.: 15/846,985

(22) Filed: Dec. 19, 2017

(65) Prior Publication Data

US 2018/0168105 A1 Jun. 21, 2018

(30) Foreign Application Priority Data

Dec. 19, 2016 (CA) .................................. CA 2952411

(51) Int. Cl.
| | | |
|---|---|---|
| *A01F 25/22* | (2006.01) | |
| *A23B 9/08* | (2006.01) | |
| *A23B 9/02* | (2006.01) | |
| *A23B 9/18* | (2006.01) | |

(52) U.S. Cl.
CPC ............... *A01F 25/22* (2013.01); *A23B 9/02* (2013.01); *A23B 9/08* (2013.01); *A23B 9/18* (2013.01)

(58) Field of Classification Search
CPC ....................... B60H 1/00678; B60H 1/00857
See application file for complete search history.

(56) References Cited

U.S. PATENT DOCUMENTS

| | | | | | |
|---|---|---|---|---|---|
| 2,117,416 | A | * | 5/1938 | Hagen ................... | F04D 29/162 415/228 |
| 2,360,440 | A | * | 10/1944 | Muller .................. | F04D 29/281 416/188 |
| 3,045,579 | A | * | 7/1962 | Jenn ....................... | F24F 7/025 454/341 |
| 3,069,071 | A | * | 12/1962 | Carlson ................ | F04D 17/165 415/116 |
| 3,224,079 | A | * | 12/1965 | Dybvig ............... | B21D 53/267 29/889.4 |
| 3,260,443 | A | * | 7/1966 | Garnett ................. | F01D 5/048 416/182 |
| 3,298,444 | A | * | 1/1967 | Haas ....................... | F01D 5/048 416/186 R |
| 3,312,386 | A | * | 4/1967 | Hull ..................... | F04D 17/165 415/218.1 |
| 3,584,968 | A | * | 6/1971 | Keith .................... | F04D 17/165 415/210.1 |

(Continued)

OTHER PUBLICATIONS

"Why Max Fans" by Fifth Season Gardening, online at https://fifthseasongardening.com/why-max-fans-mixed-flow-fans-can-outperform-centrifugal-fans attached as "FithSeasonGardening_Why_Max_Fans_2016.pdf" (Year: 2016).*

(Continued)

*Primary Examiner* — Avinash A Savani
*Assistant Examiner* — Martha M Becton
(74) *Attorney, Agent, or Firm* — Thompson Hine LLP

(57) ABSTRACT

An agricultural storage system including an agricultural storage bin for storing agricultural products therein. At least a mixed air flow fan is connected to the agricultural storage bin for generating an air flow and air pressure and providing the same to the agricultural storage bin.

10 Claims, 5 Drawing Sheets

(56) References Cited

U.S. PATENT DOCUMENTS

| | | | | |
|---|---|---|---|---|
| 4,218,190 A * | 8/1980 | Nishikawa | F04D 29/30 | 416/186 R |
| 4,647,271 A * | 3/1987 | Nagai | F04D 29/281 | 416/186 R |
| 5,328,332 A * | 7/1994 | Chiang | F04D 29/281 | 416/186 R |
| 5,336,050 A * | 8/1994 | Guida | F04D 29/282 | 29/889.21 |
| 5,810,557 A * | 9/1998 | Akinkuotu | F04D 29/281 | 415/206 |
| 5,980,207 A * | 11/1999 | Correll | F04D 29/023 | 416/186 R |
| 6,039,539 A * | 3/2000 | Berg | F04D 29/282 | 416/186 R |
| 6,558,120 B2 * | 5/2003 | Kim | F04D 25/12 | 416/186 R |
| 7,048,499 B2 * | 5/2006 | Mathson | F04D 17/06 | 415/119 |
| 7,351,031 B2 * | 4/2008 | Horng | F04D 25/0613 | 415/206 |
| 7,758,305 B2 * | 7/2010 | Kurszewski | F04D 29/162 | 415/205 |
| 8,052,386 B1 * | 11/2011 | Fitzpatrick | F04D 29/281 | 415/218.1 |
| 9,157,452 B2 * | 10/2015 | Sadi | F04D 29/442 | |
| 9,285,846 B2 * | 3/2016 | Degner | G06F 1/20 | |
| 9,505,092 B2 * | 11/2016 | Brownell | F04D 29/281 | |
| 9,913,400 B2 * | 3/2018 | Degner | G06F 1/20 | |
| 9,976,560 B2 * | 5/2018 | Brownell | F04D 29/023 | |
| 10,024,329 B2 * | 7/2018 | Fetting | F04D 25/0606 | |
| 10,851,792 B2 * | 12/2020 | Gebert | F04D 17/16 | |
| 2014/0237819 A1 * | 8/2014 | Brownell | F04D 29/281 | 29/889.6 |
| 2014/0241868 A1 * | 8/2014 | Brownell | F04D 29/023 | 415/191 |
| 2014/0241894 A1 * | 8/2014 | Brownell | F04D 29/329 | 416/223 R |
| 2014/0241920 A1 * | 8/2014 | Brownell | F04D 29/023 | 417/423.1 |
| 2014/0362522 A1 * | 12/2014 | Degner | G06F 1/20 | 361/679.47 |
| 2019/0264708 A1 * | 8/2019 | Chang | F04D 29/662 | |
| 2019/0264709 A1 * | 8/2019 | Chang | F04D 29/662 | |

OTHER PUBLICATIONS

Vortex V-Series Centrifugal Fan by Agricultural Solutions, attached as "Vortex_V_Series_2012.pdf" (Year: 2012).*

* cited by examiner

MIXED AIR FLOW FAN FOR AERATING AN AGRICULTURAL STORAGE BIN

This application claims priority to Canadian Patent Application No. 2,952,411 filed on Dec. 19, 2016, the entire contents of which are hereby incorporated by reference.

FIELD

The present invention relates to aeration of agricultural storage bins, and more particularly, to a mixed air flow fan for aerating an agricultural storage bin.

BACKGROUND

Present-day agricultural storage bins are not only used for storage of grains, cereals and other agricultural products but also for assisting in drying, cooling, heating, and pest control of the contained product by employing aeration fans connected thereto. The aeration fans are capable of supplying sufficient air pressure and air flow to the agricultural storage bins for drying, cooling, heating, and pest control.

There are currently four fan types employed for supplying air to agricultural storage bins: high speed centrifugal fans; low speed centrifugal fans; axial fans; and, inline centrifugal fans.

Unfortunately, while these fan types are capable of supplying sufficient air pressure and air flow to the agricultural storage bins for drying, cooling, heating, and pest control, they typically lack efficiency at the required combination of air pressure and air flow. With increasing energy costs, efficiency of the aeration fans becomes increasingly important in order to control overall operating expenses. This is especially true in the case of the 'traditional' inline centrifugal design where operational efficiencies are substantially lower than other designs. However, the utilization of the mixed flow design methodology in this application dramatically improves overall efficiency and better aligns those efficiencies with other aeration fan designs.

It may be desirable to provide an air flow fan for aerating an agricultural storage bin that is capable of supplying sufficient air pressure and air flow to the agricultural storage bins for drying, cooling, heating, and pest control with substantially increased efficiency.

It also may be desirable to provide a mixed air flow fan for aerating an agricultural storage bin that is capable of supplying a required combination of air pressure and air flow to the agricultural storage bins for drying, cooling, heating, and pest control with substantially increased efficiency.

It also may be desirable to provide an air flow fan for aerating an agricultural storage bin that is capable of supplying a required combination of air pressure and air flow to the agricultural storage bins for drying, cooling, heating, and pest control with substantially increased efficiency by simply replacing the centrifugal rotor of an existing inline centrifugal fan with a mixed air flow rotor.

SUMMARY

Accordingly, one object of the present invention is to provide an air flow fan for aerating an agricultural storage bin that is capable of supplying sufficient air pressure and air flow to the agricultural storage bins for drying, cooling, heating, and pest control with substantially increased efficiency.

Another object of the present invention is to provide a mixed air flow fan for aerating an agricultural storage bin that is capable of supplying a required combination of air pressure and air flow to the agricultural storage bins for drying, cooling, heating, and pest control with substantially increased efficiency.

Another object of the present invention is to provide an air flow fan for aerating an agricultural storage bin that is capable of supplying a required combination of air pressure and air flow to the agricultural storage bins for drying, cooling, heating, and pest control with substantially increased efficiency by simply replacing the centrifugal rotor of an existing inline centrifugal fan with a mixed air flow rotor.

According to one aspect of the present invention, there is provided an agricultural storage system. The agricultural storage system comprises an agricultural storage bin for storing agricultural products therein. At least a mixed air flow fan is connected to the agricultural storage bin for generating an air flow and air pressure and providing the same to the agricultural storage bin.

According to one aspect of the present invention, there is provided an agricultural storage system. The agricultural storage system comprises an agricultural storage bin for storing agricultural products therein. At least a mixed air flow fan is connected to the agricultural storage bin for generating an air flow and air pressure and providing the same to the agricultural storage bin. The mixed air flow fan comprises an air inlet for receiving ambient air. A mixed air flow rotor of the mixed air flow fan comprises an angled shroud and hub plates for reducing an incidence angle of the incoming ambient air. The mixed air flow rotor comprises blades that are backward curved combined with a twist to assist axial movement of the air. The mixed air flow fan comprises a cone shaped housing and stator blades disposed therein.

According to one aspect of the present invention, there is provided an agricultural storage system. The agricultural storage system comprises an agricultural storage bin for storing agricultural products therein. At least a mixed air flow fan is connected to the agricultural storage bin for generating an air flow and air pressure and providing the same to the agricultural storage bin. The mixed air flow fan comprises a mixed air flow rotor disposed in a housing designed for an inline centrifugal fan.

One advantage of the present invention is that it provides an air flow fan for aerating an agricultural storage bin that is capable of supplying sufficient air pressure and air flow to the agricultural storage bins for drying, cooling, heating, and pest control with substantially increased efficiency.

A further advantage of the present invention is that it provides a mixed air flow fan for aerating an agricultural storage bin that is capable of supplying a required combination of air pressure and air flow to the agricultural storage bins for drying, cooling, heating, and pest control with substantially increased efficiency.

A further advantage of the present invention is that it provides an air flow fan for aerating an agricultural storage bin that is capable of supplying a required combination of air pressure and air flow to the agricultural storage bins for drying, cooling, heating, and pest control with substantially increased efficiency by simply replacing the centrifugal rotor of an existing inline centrifugal fan with a mixed air flow rotor.

BRIEF DESCRIPTION OF THE DRAWINGS

An embodiment of the present invention is described below with reference to the accompanying drawings, in which.

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, certain methods and materials are now described.

Figure 1A:
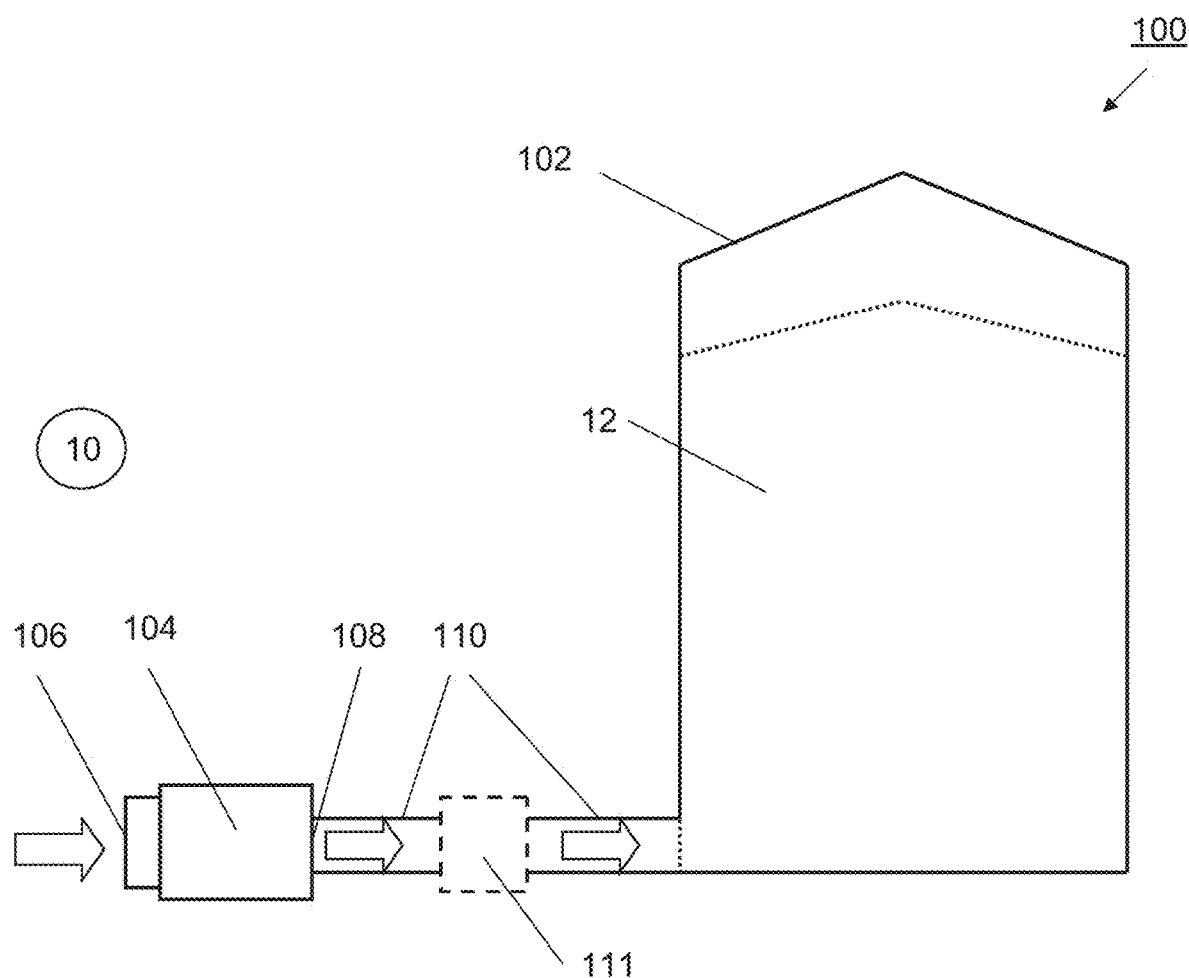
FIGS. 1a and 1b are simplified block diagrams illustrating in cross sectional views an agricultural storage system according to an embodiment of the invention.
Figure 1B:
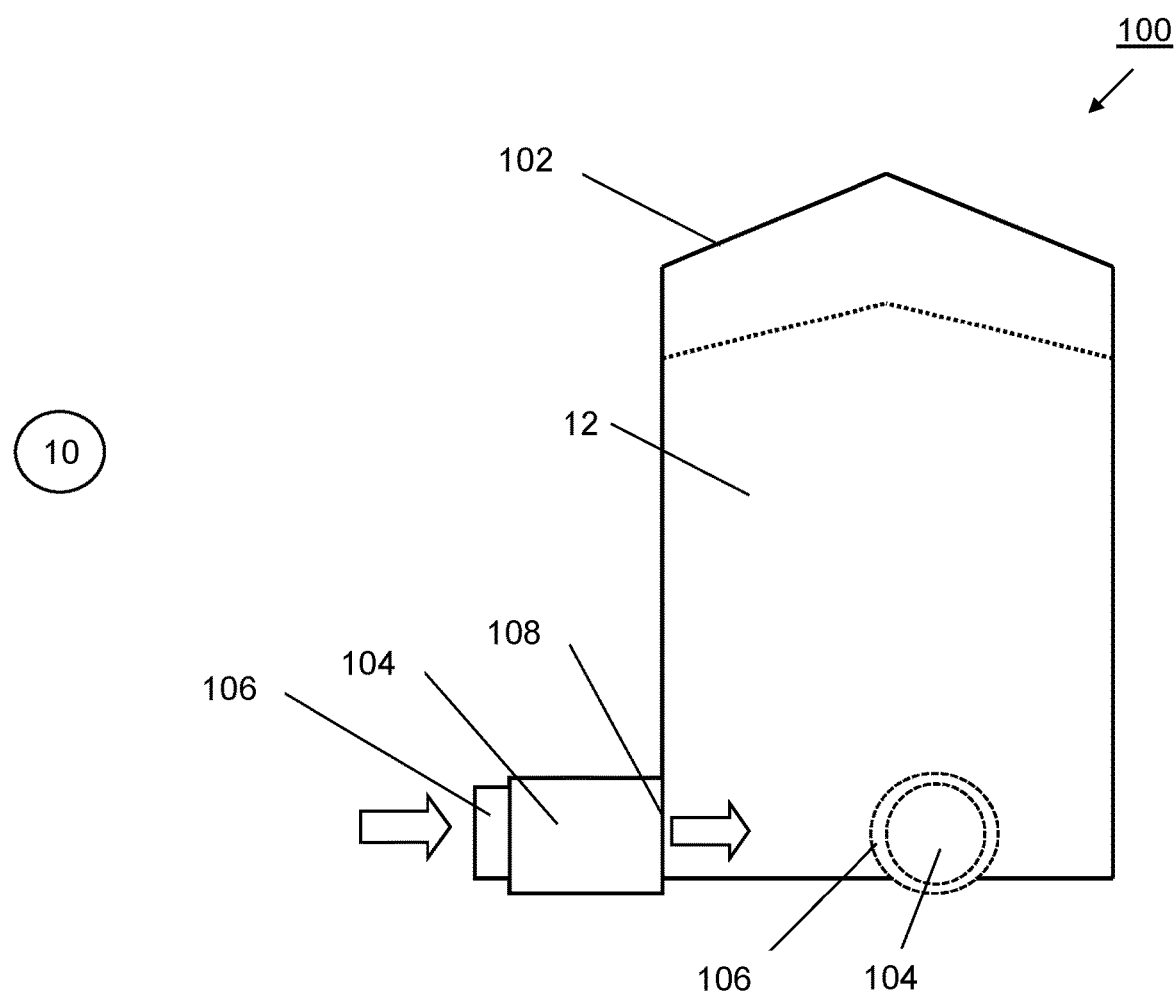

Referring to FIGS. 1a and 1b, an agricultural storage system 100 according to an embodiment of the invention is provided. The agricultural storage system comprises an agricultural storage bin 102 for storing agricultural products 12 such as, for example, grains and cereals, therein. The agricultural storage bin 102 may have a flat bottom—as illustrated—or a hopper bottom. Conduit 110, for example, tubing made of a sheet metal such as aluminum or steel, is connected to the agricultural storage bin 102 for providing an air flow and air pressure to the agricultural storage bin 102, as indicated by the block arrow. Outlet 108 of mixed air flow fan 104 is connected to the conduit 110. The mixed air flow fan 104 receives ambient air 10 via air inlet 106, as indicated by the block arrow, generates the required combination of air pressure and air flow, and provides the same via the air outlet 108 to the conduit 110 for provision to the agricultural storage bin 102. Alternatively, the mixed air flow fan 104 is directly mounted to the agricultural storage bin 102, as illustrated in FIG. 1b. Optionally, a plurality of conduits 110 and/or mixed air flow fans 104 are connected to the agricultural storage bin 102. Further optionally, devices 111 for processing the air such as, for example, drying, heating, and adding a pesticide, prior provision to the agricultural storage bin 102, are interposed between the mixed air flow fan 104 and the agricultural storage bin 102. The devices 111 for processing the air may be directly connected to the mixed air flow fan 104 and the agricultural storage bin 102 or via conduits 110.

Figure 2A:
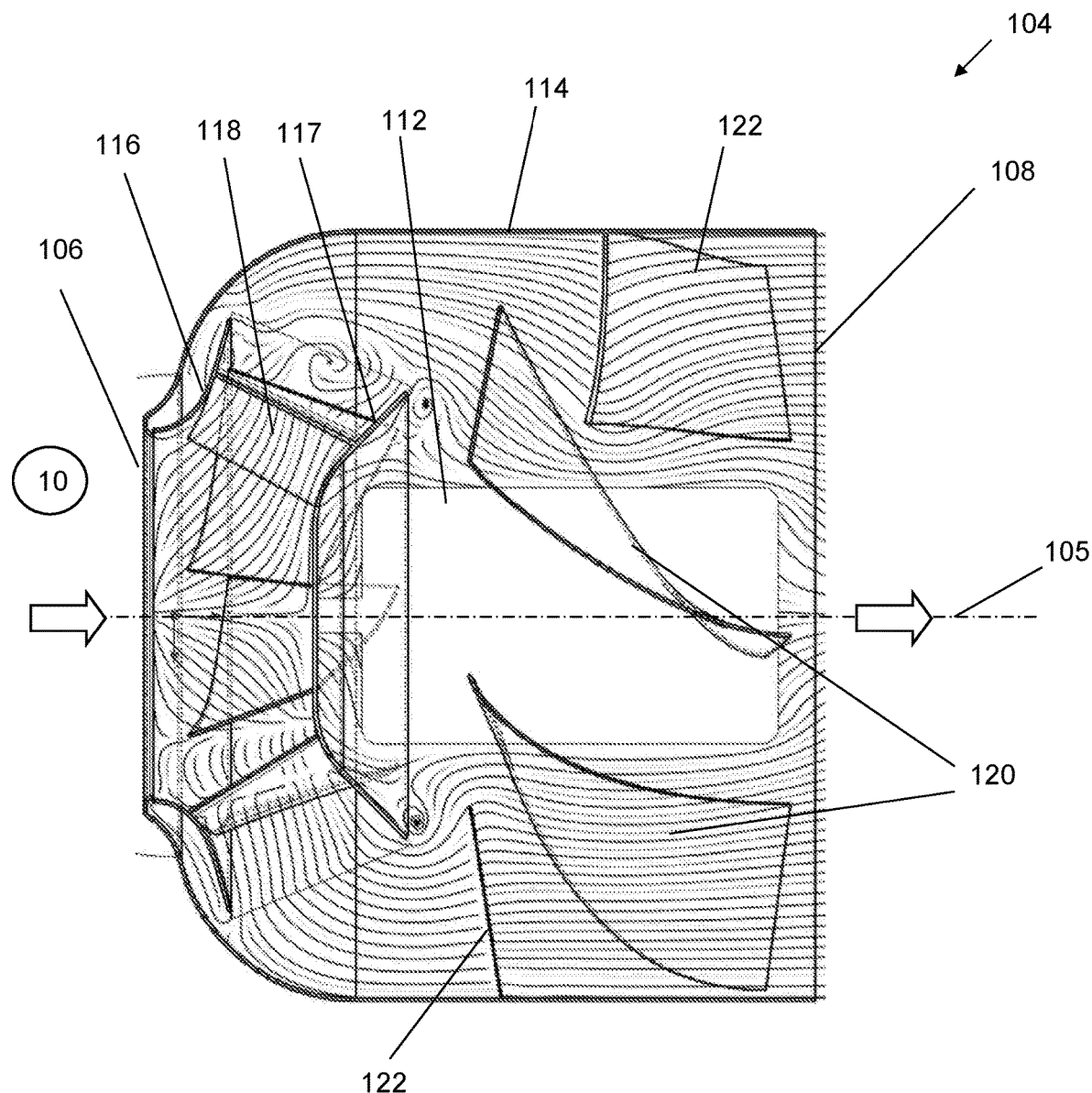
FIG. 2a is a simplified block diagram illustrating in a cross sectional view an example implementation of a mixed air flow fan of the agricultural storage system according to an embodiment of the invention.

FIG. 2a illustrates an example implementation of the mixed air flow fan 104 comprising mixed air flow rotor 112 rotatable movable about axis 105 disposed in housing 114. The mixed air flow rotor 112 comprises backward angled front shroud 116, backward angled rear shroud 117 and hub plates 118 placed therebetween that reduce the incidence angle of the incoming air. The blades 120 are backward curved combined with a twist to assist axial movement of the air. The mixed air flow rotor 112 is designed to increase static pressure radially while also effectively increasing air velocity as the air moves axially through the rotor, as indicated by the streamlines illustrating the air flow, thus producing a substantially axial air flow having sufficient static pressure at the outlet 108. The mixed air flow rotor design further reduces the pressure losses inherent in the incline centrifugal rotor design by efficiently converting swirl into axial air flow. Optionally, pressure losses in the air flow are further reduced by providing a cone shaped housing 114 and/or disposing stator blades 122 on the inside of the housing 114 to direct the air flow.

The aeration of agricultural storage bins 102 requires a combination of relatively high air flow and relatively high static air pressure in order to quickly and efficiently remove moisture. However, the static air pressure requirements are, typically, too low for an efficient centrifugal fan design and the relative air flow requirements are, typically, too low for an efficient axial fan design.

Figure 2B:
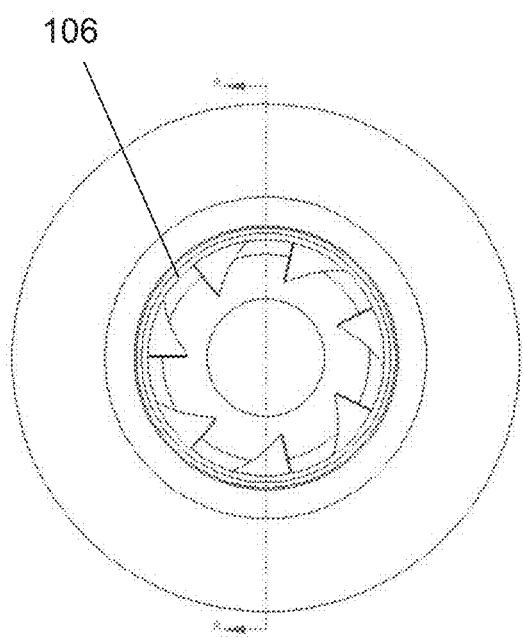
FIGS. 2b and 2c are simplified block diagrams illustrating in a front view and a cross sectional view, respectively an example implementation of the mixed air flow fan of the agricultural storage system according to an embodiment of the invention; and, FIG. 3 is a simplified block diagram illustrating in a perspective view partially in ghost an example retrofit implementation of the mixed air flow fan of the agricultural storage system according to an embodiment of the invention.
Figure 2C:
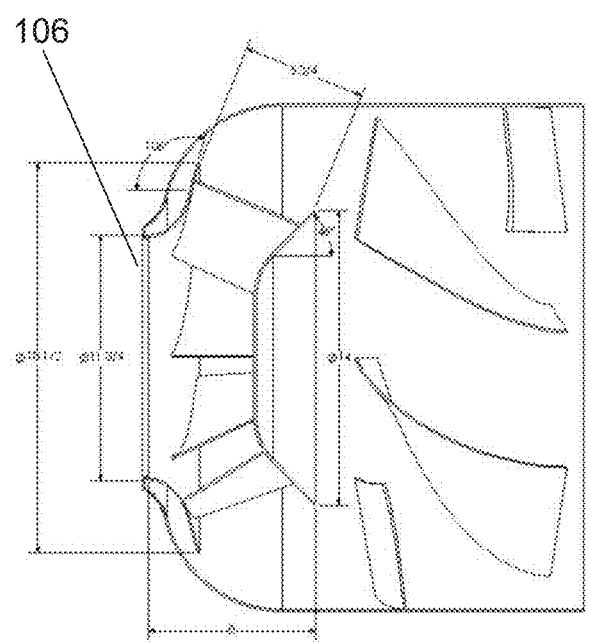

The mixed air flow fan 104 is adapted for the aeration of agricultural storage bins 102 using a standard fan design techniques to meet the combination of the required air flow and static air pressure by determining parameters such as: blade shape; blade angle; blade size; shroud size; hub size; shroud angle; hub angle; rotor diameter; and, inlet diameter, as illustrated for an example implementation in FIGS. 2b and 2c.

The mixed air flow fan 104 has been implemented to meet the following four combinations of the required air flow and static air pressure for the aeration of agricultural storage bins 102 at their best Efficiency Point (BEP):

TABLE 1

| Power (HP) | Static Air Pressure (in. wc) | Air Flow (CFM) |
| --- | --- | --- |
| 3 | 4 | 3100 |
| 5 | 6 | 4200 |
| 7.5 | 8 | 4455 |
| 10 | 10 | 5120 |

The mixed air flow fan 104 significantly reduces the energy required to achieve the same level of drying for the same volume of stored agricultural product 12 in the agricultural storage bin 102 compared to the other air fan designs discussed hereinabove. Therefore, a greater air flow volume and accordingly a greater drying effect of the stored agricultural product 12 can be achieved with the same energy consumption, or the energy consumption is decreased for the same drying effect of the same volume of the stored agricultural product 12.

Figure 3:
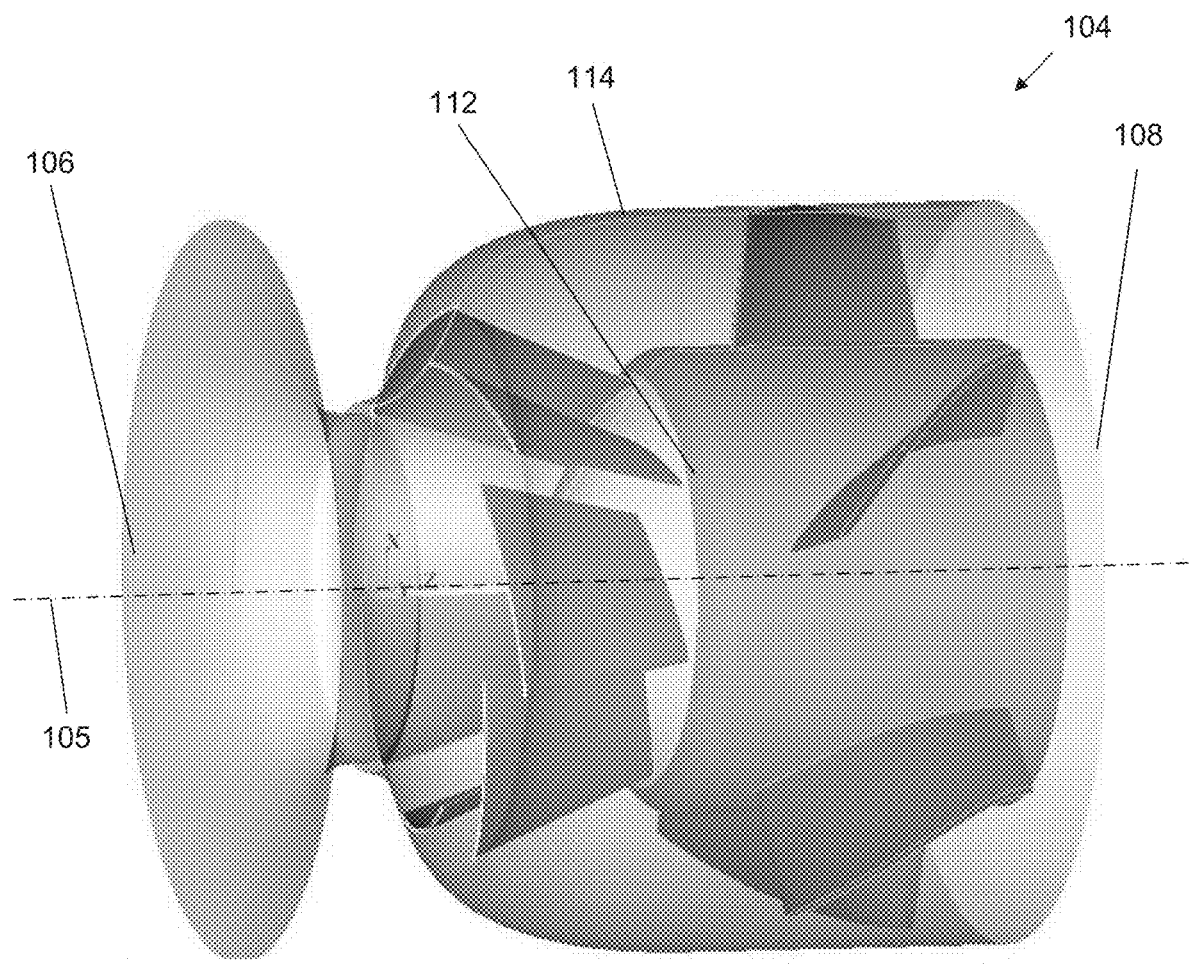

Optionally, the mixed air flow fan 104 is implemented by simply replacing the centrifugal rotor of an existing inline centrifugal fan with a mixed air flow rotor 112 which is adapted to fit into the existing housing 114 of the inline centrifugal fan, as illustrated in FIG. 3, providing—while somewhat less efficient than a specifically designed combination of mixed air flow rotor and mixed air flow housing—a simple retrofit solution for improving the efficiency of an existing agricultural storage bin aeration system having an inline centrifugal fan.

The present invention has been described herein with regard to certain embodiments. However, it will be obvious to persons skilled in the art that a number of variations and modifications can be made without departing from the scope of the invention as described herein.

What is claimed is:

1. An agricultural storage system comprising:
an agricultural storage bin for storing agricultural products therein; and, a mixed air flow fan connected to the agricultural storage bin for generating an air flow for aerating the agricultural storage bin and providing the same to the agricultural storage bin;

wherein the mixed air flow fan comprises an air inlet for receiving ambient air, and wherein a mixed air flow rotor of the mixed air flow fan comprises a front shroud having an air inlet opening for receiving the ambient air from the air inlet, a rear shroud and hub plates placed between the front shroud and the rear shroud, and wherein the front shroud and the rear shroud extend radially outwardly from an axis of rotation of the mixed air flow rotor and backwardly, and wherein the rear shroud extends a radial distance from the axis of rotation that is greater than a radial distance the air inlet opening of the front shroud extends from the axis of rotation wherein radially outward end portions of the front shroud and the rear shroud form an annular channel therebetween for guiding the air flow therethrough, and wherein a cross section of the annular channel increases towards a radially outward end of the channel; and wherein the mixed air flow fan comprises stator blades.

2. The agricultural storage system according to claim 1 wherein the mixed air flow rotor comprises blades placed downstream from the rear shroud that are backward curved combined with a twist to assist axial movement of the air.

3. The agricultural storage system according to claim 2 wherein the mixed air flow fan comprises a cone shaped housing.

4. The agricultural storage system according to claim 3 wherein the housing is curved backwardly starting in proximity of the inlet.

5. The agricultural storage system according to claim 4 wherein the housing is curved backwardly until a location downstream of the front shroud.

6. The agricultural storage system according to claim 2 wherein the mixed air flow rotor comprises a body placed downstream from the rear shroud having the blades protruding therefrom, and wherein the body extends a radial distance from the axis of rotation that is smaller than the radial distance the rear shroud extends from the axis of rotation.

7. The agricultural storage system according to claim 1 wherein the mixed air flow fan comprises a mixed air flow rotor disposed in a housing designed for an inline centrifugal fan.

8. The agricultural storage system according to claim 1 wherein the mixed air flow fan is adapted to provide air flow between 3100 CFM and 5120 CFM at respective static air pressure between 4 in. wc and 10 in. wc.

9. The agricultural storage system according to claim 1 further comprising one or more additional mixed air flow fans.

10. The agricultural storage system according to claim 1 wherein the radially outward end portion of the rear shroud is oriented more backwardly than the outward end portion of the front shroud.

* * * * *